US010313746B2

(12) United States Patent
Pan et al.

(10) Patent No.: US 10,313,746 B2
(45) Date of Patent: Jun. 4, 2019

(54) SERVER, CLIENT AND VIDEO PROCESSING METHOD

(71) Applicant: BEIJING ZHIGU RUI TUO TECH CO., LTD, Beijing (CN)

(72) Inventors: Lei Pan, Beijing (CN); Hongjiang Zhang, Beijing (CN); Kuifei Yu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 520 days.

(21) Appl. No.: 14/892,194

(22) PCT Filed: Dec. 10, 2013

(86) PCT No.: PCT/CN2013/088931
§ 371 (c)(1),
(2) Date: Nov. 18, 2015

(87) PCT Pub. No.: WO2014/187108
PCT Pub. Date: Nov. 27, 2014

(65) Prior Publication Data
US 2016/0112757 A1 Apr. 21, 2016

(30) Foreign Application Priority Data
May 20, 2013 (CN) .......................... 2013 1 0186044

(51) Int. Cl.
*G06F 15/16* (2006.01)
*H04N 21/44* (2011.01)
(Continued)

(52) U.S. Cl.
CPC ... *H04N 21/44008* (2013.01); *G06K 9/00744* (2013.01); *G06K 9/46* (2013.01);
(Continued)

(58) Field of Classification Search
CPC ........ H04N 19/176; H04N 19/14; H04N 7/18
(Continued)

(56) References Cited

U.S. PATENT DOCUMENTS

| 2005/0041842 A1* | 2/2005 | Frakes | G06K 9/3216 |
| | | | 382/128 |
| 2012/0128241 A1* | 5/2012 | Jung | G06F 17/30855 |
| | | | 382/165 |
| 2013/0236073 A1* | 9/2013 | Piratla | G06K 9/00979 |
| | | | 382/128 |

FOREIGN PATENT DOCUMENTS

| CN | 101764990 A | 6/2010 |
| CN | 101860721 A | 10/2010 |

(Continued)

OTHER PUBLICATIONS

International Search Report dated Mar. 20, 2014 for PCT Application No. PCT/CN2013/088931, 4 pages.

*Primary Examiner* — Tauqir Hussain
(74) *Attorney, Agent, or Firm* — Amin, Turocy & Watson, LLP

(57) ABSTRACT

A method includes: a server sending at least one piece of video related information to at least one client, where an image of a frame in a video corresponding to the video related information is formed of multiple sub-regions; the client receiving a video and the video related information sent by the server; selecting a sub-region; analyzing the video according to the sub-region and generating corresponding video analysis information; returning the video analysis information to the server; the server receiving the video analysis information returned by the at least one client; and adjusting the video related information according to the video analysis information. The server and client include modules for implementing functions in the method.

(Continued)

Processing cost of the video server is reduced and the efficiency and accuracy of video analysis is improved.

54 Claims, 6 Drawing Sheets

(51) Int. Cl.
    *H04N 21/226*   (2011.01)
    *H04N 21/234*   (2011.01)
    *H04N 21/858*   (2011.01)
    *G06K 9/00*   (2006.01)
    *G06K 9/46*   (2006.01)
    *H04L 29/06*   (2006.01)
    *H04N 21/84*   (2011.01)

(52) U.S. Cl.
    CPC .......... *H04L 65/4084* (2013.01); *H04L 65/60* (2013.01); *H04L 65/602* (2013.01); *H04L 67/42* (2013.01); *H04N 21/226* (2013.01); *H04N 21/23418* (2013.01); *H04N 21/84* (2013.01); *H04N 21/858* (2013.01); *G06K 2009/4666* (2013.01)

(58) Field of Classification Search
    USPC ........................................................ 709/203
    See application file for complete search history.

(56) References Cited

FOREIGN PATENT DOCUMENTS

| | | |
|---|---|---|
| CN | 101908142 A | 12/2010 |
| CN | 102638456 A | 8/2012 |
| CN | 102646312 A | 8/2012 |
| CN | 202404615 U | 8/2012 |
| CN | 102693008 A | 9/2012 |
| CN | 102883145 A | 1/2013 |
| CN | 103248705 A | 8/2013 |
| JP | 2012248999 A | 12/2012 |

* cited by examiner

SERVER, CLIENT AND VIDEO PROCESSING METHOD

RELATED APPLICATIONS

This application is a U.S. National Stage filing under 35 U.S.C. § 371 of international patent cooperation treaty (PCT) application No. PCT/CN2013/088931, filed Dec. 10, 2013, and entitled "SERVER, CLIENT AND VIDEO PROCESSING METHOD," which claims priority to Chinese Patent Application No. 201310186044.3, filed with the Chinese Patent Office on May 20, 2013 and entitled "SERVER, CLIENT, AND VIDEO PROCESSING METHOD", which applications are hereby incorporated herein by reference in their respective entireties.

BACKGROUND

Technical Field

The present application relates to the field of information processing technologies, and in particular, to a server, a client, and a video processing method.

Related Art

Identifying, in a video, an object in which people are interested can be widely used in applications such as advertisement, video surveillance. However, with the increasing video resolution and the massively growing video content, it is time-consuming and inefficient to identify full content of the video.

To improve the identification efficiency, it is feasible to process a key frame (I frame) only so as to reduce the amount of information to be processed. However, this manner does not solve the key problem for improving the efficiency of video mode identification.

In addition, the mode identification of the video is generally performed at the server. This manner is advantageous in that once the identification is completed, the identified object can be widely applied; however, it requires long time and high cost for the server to process massive video content generated over the Internet.

SUMMARY

A technical problem to be solved by one or more embodiments of the present application is to provide a server, a client, and a video processing method, so as to reduce the processing cost of the video server and improve the efficiency of video identification.

To achieve the foregoing objective, according to a first aspect, the present application provides a server video processing method, which includes:

sending a video and at least one piece of video related information to at least one client, where an image of a frame in the video is formed of multiple sub-regions;

receiving video analysis information returned by the at least one client; and adjusting the video related information according to the video analysis information.

According to a second aspect, the present application provides a client video processing method, which includes:

receiving a video and at least one piece of video related information that are sent by a server, where an image of a frame in the video corresponding to the video related information is formed of multiple sub-regions;

selecting at least one sub-region;

performing video analysis on the selected sub-region, and generating corresponding video analysis information; and returning the video analysis information to the server.

According to a third aspect, the present application provides a server, which includes:

a server input/output module, used for sending at least one piece of video related information to at least one client, where an image of a frame in a video corresponding to the video related information is formed of multiple sub-regions;

the server input/output module being further used for receiving video analysis information returned by the at least one client; and a video related information processing module, used for adjusting the video related information according to the video analysis information.

According to a fourth aspect, the present application provides a client, which includes:

a client input/output module, used for receiving a video and at least one piece of video related information that are sent by the server, where an image of a frame in the video is formed by multiple sub-regions;

a client sub-region selection module, used for selecting at least one sub-region; and a client video analysis module, used for performing video analysis on the selected sub-region, and generating corresponding video analysis information, where the client input/output module is further used for returning the video analysis information to the server.

According to a fifth aspect, the present application provides a computer program product that enables a computer to execute the method according to the technical solution of the first or second aspect.

According to a sixth aspect, the present application provides a computer readable medium that includes a computer execution instruction, where when a central processing unit of a computer executes the computer execution instruction, the computer execution instruction is used for enabling the computer to execute the method according to the technical solution of the first or second aspect.

According to a seventh aspect, the present application provides a server that includes a central processing unit, a memory, and a communications interface, where the memory stores a computer operating instruction, and the central processing unit, the memory, and the communications interface are connected through a communication bus; and when the server runs, the central processing unit executes the computer operating instruction stored by the memory, so that the server executes the method according to the technical solution of the first aspect.

According to an eighth aspect, the present application provides a client that includes a central processing unit, a memory, and a communications interface, where the memory stores a computer operating instruction, and the central processing unit, the memory, and the communications interface are connected through a communication bus; and when the client runs, the central processing unit executes the computer operating instruction stored by the memory, so that the client executes the method according to the technical solution of the second aspect.

In the foregoing technical solution according to the embodiments of the present application, an image of a video frame is formed of multiple sub-regions, and a required sub-region is selected and analyzed so that video analysis information is obtained, thereby improving efficiency and accuracy of video analysis. Moreover, in the technical solution according to the embodiments of the present application, a client participates in video analysis processing, and when massive videos need to be processed, such a method significantly reduces the processing cost of a video server.

DETAILED DESCRIPTION

A method and apparatus of the present application are described in detail in the following with reference to the accompanying drawings and embodiments.

Figure 1:
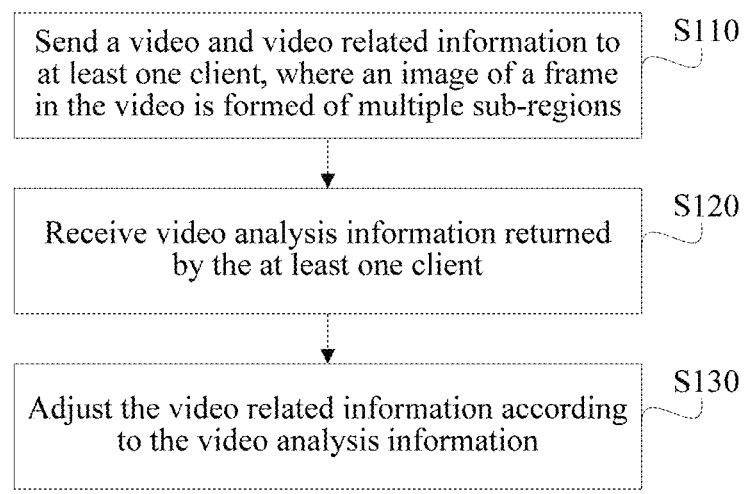
FIG. 1 is a schematic flowchart of a server video processing method according to an embodiment of the present application.

As shown in FIG. 1, an embodiment of the present application provides a server video processing method, which includes the following steps:

S110: Send a video and video related information to at least one client, where an image of a frame in the video is formed of multiple sub-regions.

S120: Receive video analysis information returned by the at least one client.

S130: Adjust the video related information according to the video analysis information.

The server herein may be a video providing server, and may also be another server for implementing the foregoing steps. In some implementation manners, the server may also be regarded as a super node. The video and video related information may be sent by the same server to the client, and may also be sent by different servers to the client.

The multiple sub-regions may be set by the server or the client. In a possible implementation manner, before Step S110, the method further includes a step of setting sub-regions of the video.

Figure 2:
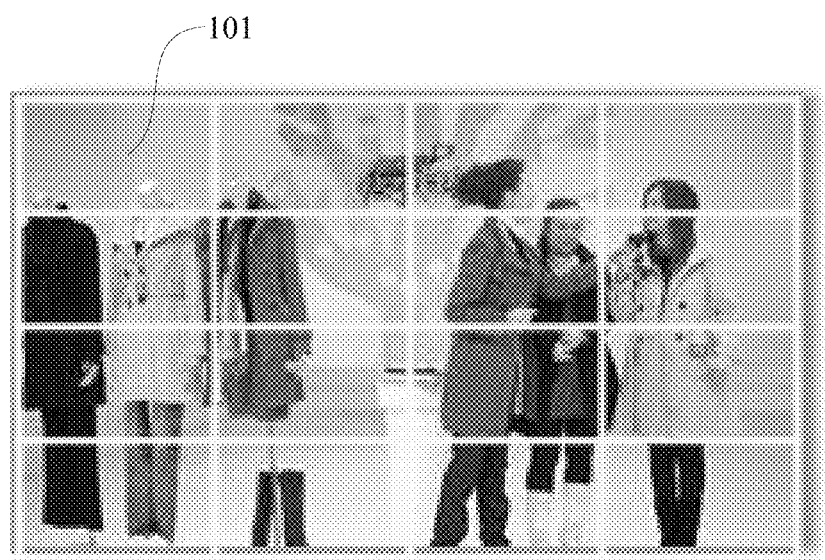
FIG. 2 is a schematic view of an image of a frame in a video being formed by sub-regions according to an embodiment of the present application.

In a possible implementation manner of the embodiment of the present application, the multiple sub-regions are distributed in the form of grids. As shown in FIG. 2, preferably, in an implementation manner, a frame image in the video is formed of multiple square grid-shaped sub-regions 101 that are of the same size, that is, the image is divided into N rows and N columns (M and N are natural numbers greater than 1, and there are 4 rows and 4 columns in FIG. 2), and M*N sub-regions are obtained. In other possible implementation manners of the embodiment of the present application, the sub-regions may also be in the shape of other polygons, such as regular hexagons. For images of different frames in the video, the sub-regions may be the same or different. For example, in one frame, the multiple sub-regions forming the image are larger square grids, and in another frame, the sub-regions may be smaller square grids.

In a possible implementation manner of the embodiment of the present application, adjacent sub-regions may have an overlapping part.

In a possible implementation manner of the embodiment of the present application, sizes of the multiple sub-regions are set according to an image feature of the video.

Preferably, in the embodiment of the present application, the image feature includes resolution of the image and/or scene information of the image. For example, when resolution of the image is low and details of the image cannot be identified accurately, the sizes of the sub-regions may be set large; and when the resolution of the image is high, the sizes of the sub-regions may be set small, and details in the sub-regions can be analyzed and identified more accurately. The scene information of the image herein includes identified human head portrait size information of a shape feature of motion associated pixel groups between video frames. For example, if a head portrait size is large, the object is generally large, and in this case, the sub-regions may be set large. If the shape of the motion associated pixel groups between video frames is large, the object is generally large, and in this case, the sub-regions may be set large. In some possible implementation manners of the embodiment of the present application, reference may be made to one type of the foregoing information for the setting of the sub-regions, and in other possible implementation manners of the embodiment of the present application, reference may also be made to multiple types of the foregoing information for the setting of the sub-regions.

Preferably, in a possible implementation manner of the embodiment of the present application, the video analysis information includes identity information of an object in the sub-region. The identity information herein may be a tag of the object, and when the identity information is displayed, the user can obtain brief information of the object, and so on through the identity information.

Preferably, in a possible implementation manner of the embodiment of the present application, the identity information of the object includes adaptation-completed information. The adaptation-completed information is added in the video related information and sent to the client, so that the client can perform better video analysis on the object in the sub-region.

The step of adjusting the video related information according to the video analysis information includes: adding the identity information of the object in and/or modifying the identity information of the object in and/or deleting the identity information of the object from the video related information.

Herein, if the video related information does not have identity information about the object, the identity information of the object returned by the client is added in the video related information. When the video related information has identity information of the object, and the identity information of the object returned by the client is more accurate or detailed than the existing identity information, the identity information of the object is modified.

Preferably, in a possible implementation manner of the embodiment of the present application, the video analysis information further includes hyperlink information of an object in the sub-region. The hyperlink may be a content link to detailed description of the object or a purchase interface of the object, and a user can know more about the object or directly buy the object through the hyperlink information of the object.

The step of adjusting the video related information according to the video analysis information includes: adding the hyperlink information of the object in and/or modifying the hyperlink information of the object in and/or deleting the hyperlink information of the object from the video related information.

Herein, if the video related information does not have hyperlink information about the object, the hyperlink information of the object returned by the client is added in the video related information. When the video related information has hyperlink information of the object, and the hyperlink information of the object returned by the client is more accurate or detailed than the existing hyperlink information, the hyperlink information of the object is modified.

Preferably, in a possible implementation manner of the embodiment of the present application, the video analysis information includes sub-region setting optimization information.

Preferably, the step of adjusting the video related information according to the video analysis information includes: adjusting settings of the sub-regions according to the sub-region setting optimization information.

After setting the sub-regions, when the client or server analyzes the video, it may be found that current settings of the sub-regions are not optimized and affect operations such as object identification; in this case, the sub-region setting optimization information may be generated so as to optimize settings of the sub-regions of a current image.

Preferably, in a possible implementation manner of the embodiment of the present application, the video related information includes sub-region completion index information. To save video analysis resources, analysis processing on some frame image sub-regions where analysis is complete may be reduced. For example, herein, the sub-region completion index information is set, and the completion index increases as the completion of the sub-region increases. When the video is processed, a sub-region whose sub-region completion index information exceeds a set threshold may be not selected for processing.

In some implementation manners, the sub-region completion index information may also be set to attenuate along with time. For example, after a set period of time, the completion index is decreased by a certain value, and when the completion index decreases below the set threshold, analysis processing may be performed on the corresponding sub-region again to update information of the sub-region.

Preferably, the step of adjusting the video related information according to the video analysis information includes: updating the sub-region completion index information according to the video analysis information.

In a possible implementation manner of the embodiment of the present application, the server receives video analysis information returned by multiple clients, and therefore, before the step of adjusting the video related information according to the video analysis information, the received video analysis information returned by the multiple clients needs to be integrated. The integration herein includes: summarizing the video analysis information returned by the multiple clients, for example, summarizing identification information of multiple aspects of the same sub-region object, analyzing different information of the same aspect of the object, or further differentiating information. For example: for an object of a sub-region of a frame image in the video, analysis information returned by a first part of clients includes that: the object is a bag; analysis information returned by a second part of clients includes that: the object is a red handbag; and information returned by a third part of clients includes that: the object is a handbag from a first brand. After these pieces of information are summarized, the obtained analysis information may be that: the object is a red handbag from a first brand. Assuming that information returned by a fourth part of clients includes that: the object is a handbag from a second brand, the integration of the information may further include: identifying the brand of the object to obtain a correct result and adding the correct result in the integrated analysis information; or adding all the different analysis information in the integrated analysis information, for example: the obtained integrated analysis information may be that: the object is a red handbag, and it is considered that by 67%, the red handbag is from the first brand, and by 33%, the red handbag is from the second brand.

In a possible implementation manner of the embodiment of the present application, the server may also analyze the video, that is, before the step of adjusting the video related information according to the video analysis information, the method further includes that: the server:

selects a sub-region; and performs video analysis on the selected sub-region, and generates corresponding video analysis information.

For specific methods for selecting a sub-region and performing video analysis, reference may be made to the process in which the client processes the video in the following.

The foregoing integration of the video analysis information further includes a step of integrating the received video analysis information returned by the at least one client and the video analysis information generated by the server.

After adjusting the video related information according to the integrated video analysis information, the server shares the adjusted video related information with other clients.

In addition, an embodiment of the present application further provides a computer readable medium which includes a computer readable instruction that performs the following operations when being executed: operations of Step S110, Step S120, and Step S130 in the method of the embodiment shown in FIG. 1.

Figure 3:
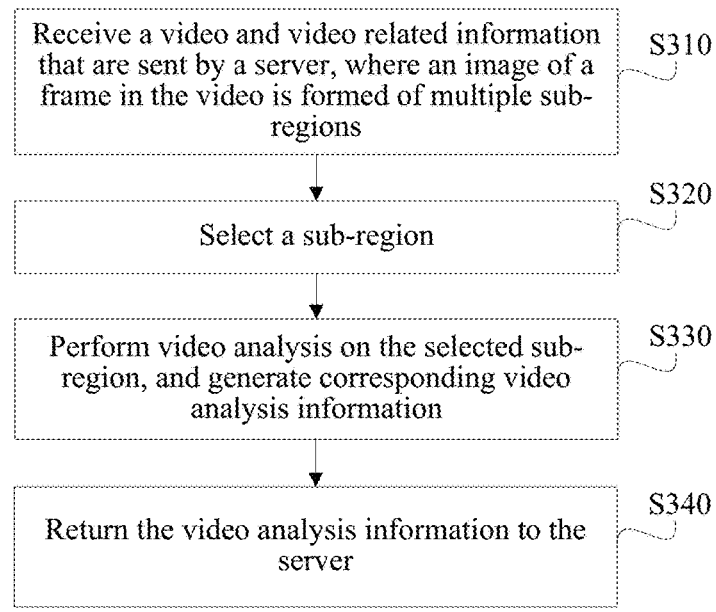
FIG. 3 is a schematic flowchart of a client video processing method according to an embodiment of the present application.

As shown in FIG. 3, an embodiment of the present application further provides a client video processing method, which includes the following steps:

S310: Receive a video and video related information that are sent by a server, where an image of a frame in the video is formed of multiple sub-regions.

S320: Select a sub-region.

S330: Perform video analysis on the selected sub-region, and generate corresponding video analysis information.

S340: Return the video analysis information to the server.

Apart from setting the sub-regions of the video on the server as described above, in a possible implementation manner of the embodiment of the present application, after receiving the video and video related information, the method may further include a step of setting the sub-regions of the video, and for specific settings, reference may be made to the corresponding description in the foregoing.

Preferably, in a possible implementation manner of the embodiment of the present application, a manner for selecting the sub-region includes: selecting the sub-region according to attention of a user.

Selection of a sub-region herein includes selecting a frame image and selecting a corresponding region on the selected frame image. The attention of the user may be obtained by proactively detecting a visual focus of the user and stay time of the user on the corresponding frame image, or obtained from an action performed by the user on the corresponding video, for example, repeated playback of a frame image part by the user, an operation performed by the user on a corresponding region on the frame image, and so on. For example, if it is captured by a sensor, such as a camera, that a visual focus of the user is corresponding to a certain part of the current frame image, a sub-region corresponding to this part is selected and subject to video analysis; for example, if it is detected that the user clicks or slides through one or more parts on the current frame image by using a mouse, a sub-region corresponding to the part is selected and subject to video analysis.

Preferably, in a possible implementation manner of the embodiment of the present application, a manner for selecting the sub-region includes: selecting the sub-region according to feature information of a user.

The feature information of the user may include: age, gender, location, profession, and so on of the user. For example, in the same video, users of different ages and genders may be interested in different frames; in the same frame image, users of different ages and genders may be interested in different sub-regions. Therefore, the corresponding sub-region may also be selected according to the feature information of the user.

Preferably, in a possible implementation manner of the embodiment of the present application, a manner for selecting the sub-region includes: selecting the sub-region according to completion index information in the video related information. For example, when the completion index information of a certain sub-region exceeds a certain set threshold, it indicates that the analysis on the sub-region is relatively complete. Therefore, whether the user pays high attention to the corresponding sub-region or not, the sub-region is not selected for video processing, thereby saving computation resources and time.

Preferably, in a possible implementation manner of the embodiment of the present application, the manner for selecting the sub-region includes:

selecting the sub-region according to motion prediction of associated pixel groups in the video.

The associated pixel groups are adjacent and associated pixel groups, for example, when an object on a frame image is a red bag, before the object is identified, it is already known that the object is a lump of group pixel group having a certain shape and size. Assuming that the associated pixel groups are not in one sub-region in a frame image (for example, the associated pixel groups are at intersections of two or more sub-regions), according to a motion trend of the associated pixel groups in previous and next frames, the location where the associated pixel groups may arrive in a certain frame after or before the current frame may be predicted. Therefore, by means of the motion prediction, a corresponding sub-region in a frame image where the associated pixel groups are located in the sub-region is found and subject to video analysis, and the identification efficiency is improved.

For the selection of the sub-region, reference may be made to multiple types of the foregoing factors, or an appropriate sub-region may be selected with reference to other information.

Preferably, in a possible implementation manner of the embodiment of the present application, the step of performing video analysis on the selected sub-region and generating corresponding video analysis information includes:

identifying an object in the sub-region, and generating identity information of the object.

Preferably, in a possible implementation manner of the embodiment of the present application, the identity information of the object includes adaptation-completed information. That is, when an object in the sub-region is identified, mode adaptation is performed on the identified fuzzy object, so as to accurately identify the object ultimately. During the mode adaptation, multiple modes may be subject to adaptation with the fuzzy object, and for a mode already adapted to the object, the adaptation-completed information is generated. The client sends the adaptation-completed information to the server, thereby providing reference for the present client, other clients, or the server to identify the same object.

Preferably, in a possible implementation manner of the embodiment of the present application, the video related information includes adaptation-completed information. The step of identifying an object in the sub-region, and generating identity information of the object includes:

performing mode adaptation on the object in the sub-region according to the adaptation-completed information, and updating the adaptation-completed information.

If the video related information received by the client already includes the adaptation-completed information, mode adaptation is performed on the object in the sub-region. For example, the adaptation-completed information includes mode information that fails to be adapted to the object, and when the current client further identifies the same object, the current client may skip the mode that has been adapted to the identification, and directly adapts a mode, which has not been adapted, to the object; or the adapted mode information may be used as reference to improve the current identification accuracy.

Preferably, in a possible implementation manner of the embodiment of the present application, the method further includes: generating hyperlink information of the object.

Preferably, in a possible implementation manner of the embodiment of the present application, the video analysis information includes hyperlink information of an object in the sub-region.

Preferably, in a possible implementation manner of the embodiment of the present application, the method further includes storing the hyperlink information. The foregoing hyperlink information generated during the video analysis or the hyperlink information of the object carried in the video related information sent by the server can be both stored locally. In this way, after the user watches the video, the user may store the hyperlink information of the object locally to know more about or directly buy a product corresponding to the object.

To optimize settings of the sub-region and perform better analysis processing on the video of the sub-region, preferably, in a possible implementation manner of the embodiment of the present application, the step of performing video analysis on the selected sub-region and generating corresponding video analysis information includes: generating sub-region setting optimization information.

Preferably, in a possible implementation manner of the embodiment of the present application, a manner for generating the sub-region setting optimization information includes: generating the sub-region setting optimization information according to interaction with the user. For example, when it is detected that the visual focus of the user is always at intersections of multiple adjacent sub-regions, it indicates that settings of the current sub-region need to be optimized, or the user draws a region on a displayed image through an input device, where the region is larger than the current sub-region; in both cases, the sub-region setting optimization information can be generated, so as to optimize the current sub-region settings.

Preferably, in a possible implementation manner of the embodiment of the present application, a manner for generating the sub-region setting optimization information includes: generating the sub-region setting optimization information according to a shape feature of associated pixel groups in the image of the video frame. For example, it is detected that sizes of multiple associated pixel groups in the image of the video frame are far smaller than that of the currently set sub-region, the current sub-region possibly needs to be set to a smaller region; alternatively, if details of a human face need to be identified, as the technology for identifying whether the object is a human face is mature, when the current associated pixel groups are identified as a human face, the settings of the sub-region may be adjusted according to the sizes of the pixel groups, so that the details of the human face are identified more accurately and efficiently.

Preferably, in a possible implementation manner of the embodiment of the present application, a manner for generating the sub-region setting optimization information includes: generating the sub-region setting optimization information according to an inter-frame relation of the video. The inter-frame relation herein refers to a relationship between a previous frame and a next frame of the video. For example, the same object in a previous frame and a next frame of the video may change from large to small, and accordingly, the size of the object in a certain frame image before or after the current frame can be predicted, and the settings of the sub-region of the frame image can be adjusted according to the predicted information.

Definitely, the sub-region setting optimization information may also be generated with reference to multiple types of the foregoing factors at the same time, or generated with reference to other factors.

If some received video related information already has information corresponding to the sub-region, that is, some other client or server has analyzed the sub-region, the client may perform further analysis processing on the sub-region, so as to improve the accuracy of the existing information and update the existing information.

In addition, an embodiment of the present application further provides a computer readable medium which includes a computer readable instruction that performs the following operations when being executed: operations of Step S310, Step S320, Step S330, and Step S340 in the method of the embodiment shown in FIG. 3.

In a possible implementation manner of the embodiment of the present application, with reference to the method described in FIG. 1 and FIG. 3, the processing performed on the video by the server and client includes:

setting sub-regions for a video;

the server sending the video and video related information to at least one client, where an image of a frame in the video is formed of multiple sub-regions;

the client receiving the video and video related information that are sent by the server;

selects a sub-region;

performing video analysis on the selected sub-region, and generating corresponding video analysis information;

returning the video analysis information to the server;

the server receiving video analysis information returned by the at least one client; and adjusting the video related information according to the video analysis information.

Figure 4:
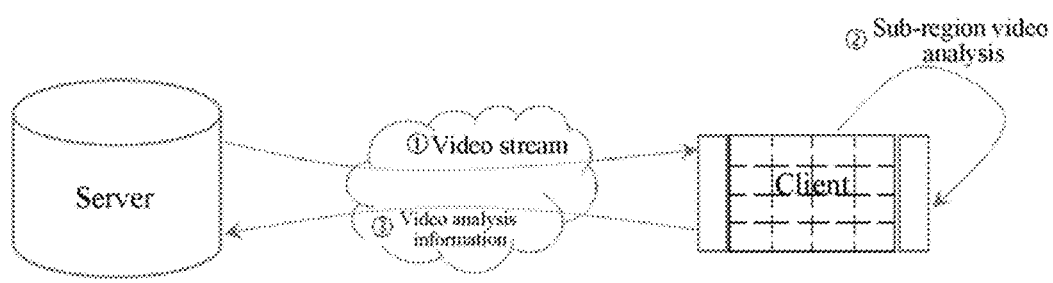
FIG. 4 is a schematic view of transmission of a video, video related information, and video analysis information between a server and a client according to an embodiment of the present application.

A manner for transmitting a video stream and video analysis information between the server and the client is shown in FIG. 4, and the video stream includes the video and video related information.

A person skilled in the art can understand that, in the foregoing method according to the specific implementation manner of the present application, the serial numbers of the steps do not indicate the sequence for executing the steps, and the sequence for executing the steps should be determined according to functions and internal logics thereof, but should not limit an implementation process of the specific implementation manner of the present application.

Figure 5:
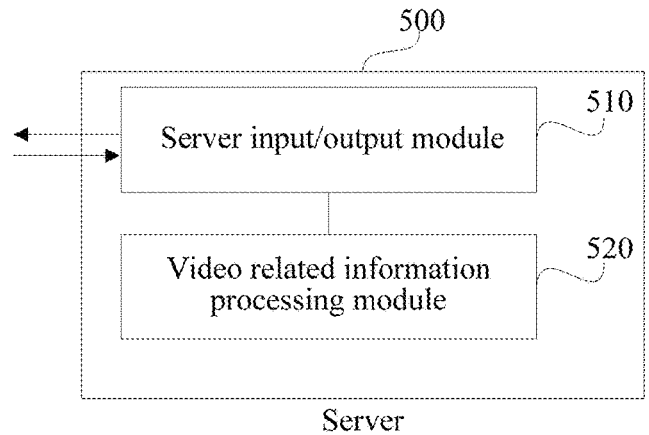
FIG. 5 is a schematic structural diagram of a server according to an embodiment of the present application.

As shown in FIG. 5, an embodiment of the present application provides a server 500, which includes:

a server input/output module 510, used for sending video related information to at least one client, where an image of a frame in a video corresponding to the video related information is formed of multiple sub-regions;

the server input/output module 510 being further used for receiving video analysis information returned by the at least one client; and a video related information processing module 520, used for adjusting the video related information according to the video analysis information.

In a possible implementation manner of the embodiment of the present application, the server 500 further sends the video corresponding to the video related information to the client. In other possible implementation manners of the present application, the video corresponding to the video related information may also be sent by another server to the client.

Figure 6:
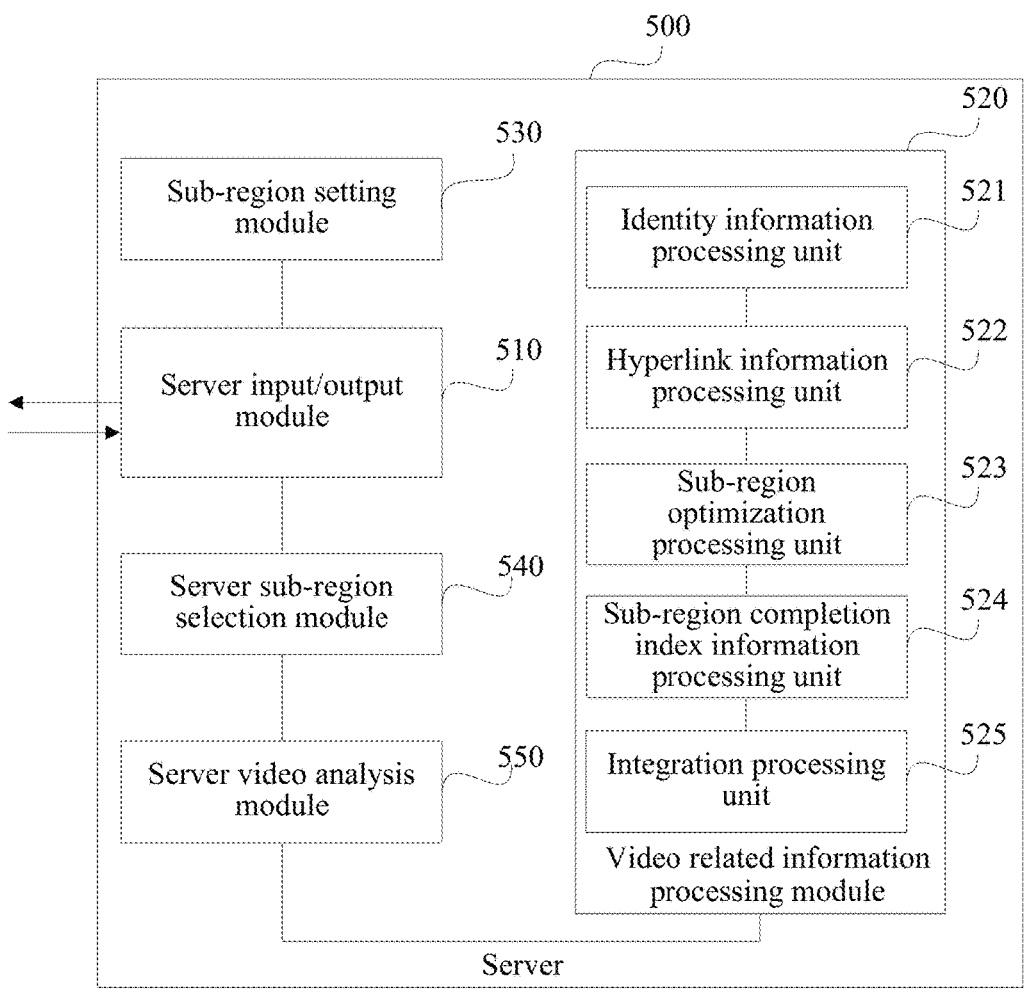
FIG. 6 is a schematic structural diagram of another server according to an embodiment of the present application.

Preferably, as shown in FIG. 6, in a possible implementation manner of the present application, the server 500 further includes a sub-region setting module 530, used for setting the multiple sub-regions according to an image feature of the video.

Preferably, in a possible implementation manner of the embodiment of the present application, the video analysis information includes identity information of an object in the sub-region. Preferably, in a possible implementation manner of the embodiment of the present application, the identity information of the object includes adaptation-completed information.

Preferably, in a possible implementation manner of the present application, the video related information processing module 520 includes an identity information processing unit 521, which implements a function thereof according to corresponding description in the foregoing method embodiment.

Specifically, the identity information processing unit 521 is used for adding the identity information of the object in and/or modifying the identity information of the object in and/or deleting the identity information of the object from the video related information.

Preferably, in a possible implementation manner of the embodiment of the present application, the video analysis information includes hyperlink information of an object in the sub-region.

Preferably, in a possible implementation manner of the present application, the video related information processing module 520 includes a hyperlink information processing unit 522, which implements a function thereof according to corresponding description in the foregoing method embodiment.

Specifically, the hyperlink information processing unit 522 is used for adding the hyperlink information of the object in and/or modifying the hyperlink information of the object in and/or deleting the hyperlink information of the object from the video related information.

Preferably, in a possible implementation manner of the present application, the video analysis information includes sub-region setting optimization information.

Preferably, in a possible implementation manner of the present application, the video related information processing module 520 includes a sub-region optimization processing unit 523, which implements a function thereof according to corresponding description in the foregoing method embodiment.

Specifically, the sub-region optimization processing unit 523 adjusts settings of the sub-region according to the sub-region setting optimization information.

Preferably, in a possible implementation manner of the present application, the video related information includes sub-region completion index information.

Preferably, in a possible implementation manner of the present application, the video related information processing module 520 includes a sub-region completion index information processing unit 524, which implements a function thereof according to corresponding description in the foregoing method embodiment.

Specifically, the sub-region completion index information processing unit 524 is used for updating the sub-region completion index information according to the video analysis information.

Preferably, in a possible implementation manner of the present application, the server input/output module 510 is further used for receiving video analysis information returned by multiple clients.

The video related information processing module 520 includes an integration processing unit 525, which implements a function thereof according to corresponding description in the foregoing method embodiment.

Specifically, the integration processing unit 525 is used for integrating the received video analysis information returned by the multiple clients.

Preferably, in a possible implementation manner of the present application, the server 500 further includes a server sub-region selection module 540 and a server video analysis module 550, which implement functions thereof according to corresponding description in the foregoing method embodiment.

Specifically, the server sub-region selection module 540 is used for selecting a sub-region; and the server video analysis module 550 is used for performing video analysis on the selected sub-region, and generating corresponding video analysis information.

Preferably, in a possible implementation manner of the present application, the integration processing unit 525 is further used for integrating the received video analysis information returned by the at least one client and the video analysis information generated by the server; refer to corresponding description in the foregoing method embodiment for a specific implementation manner.

Figure 7:
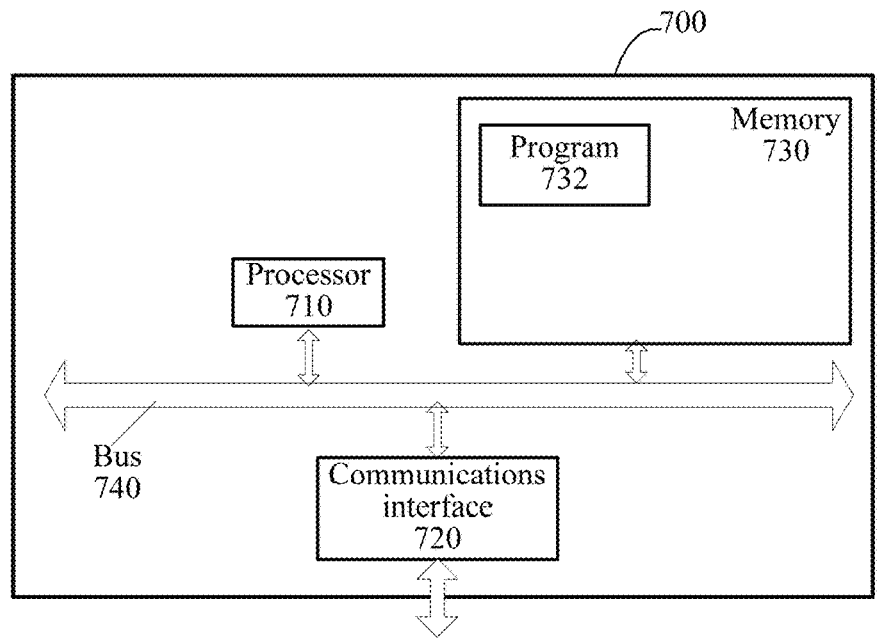
FIG. 7 is a schematic structural diagram of still another server according to an embodiment of the present application.

FIG. 7 is a schematic structural diagram of still another server 700 according to an embodiment of the present application, and the embodiment of the present application does not limit the specific implementation of the server. As shown in FIG. 7, the server 700 may include:

a processor 710, a communications interface 720, a memory 730, and a communication bus 740, where the processor 710, the communications interface 720, and the memory 730 communicate with each other through the communication bus 740.

The communications interface 720 is used for communication with network elements such as a client.

The processor 710 is used for executing a program 732, and may specifically execute related steps in the method embodiment shown in FIG. 1 and FIG. 2.

Specifically, the program 732 may include program code, and the program code includes a computer operating instruction.

The processor 710 may be a central processing unit (CPU), or an Application Specific Integrated Circuit (ASIC), or may be configured as one or more integrated circuits for implementing the embodiment of the present application.

The memory 730 is used for storing the program 732. The memory 730 may include a high-speed Random Access Memory (RAM), and may also include a non-volatile memory, for example, at least one disk memory. The program 732 specifically may enable the server 700 to execute the following steps:

sending video related information to at least one client, where an image of a frame in a video corresponding to the video related information is formed of multiple sub-regions;

receiving video analysis information returned by the at least one client; and adjusting the video related information according to the video analysis information.

For specific implementation of each step in the program 732, reference may be made to a corresponding step or corresponding description in a unit in the foregoing embodiments, and description is not repeated herein. It can be clearly understood by a person skilled in the art that, to make the description easy and precise, for a detailed working process of the foregoing devices and modules, reference may be made to the corresponding process description in the foregoing method embodiment, and description is not repeated herein.

Figure 8:
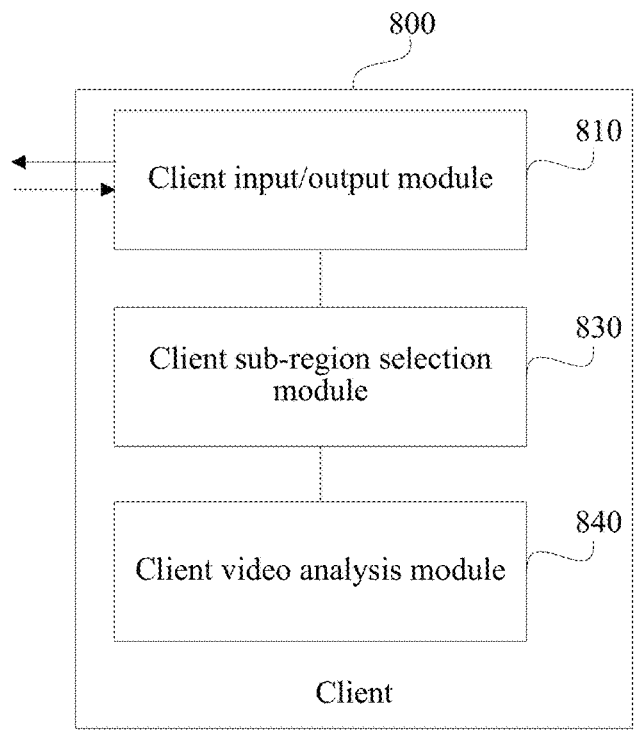
FIG. 8 is a schematic structural diagram of a client according to an embodiment of the present application.

As shown in FIG. 8, an embodiment of the present application provides a client 800, which includes:

a client input/output module 810, used for receiving a video and video related information that are sent by a server, where an image of a frame in the video is formed of multiple sub-regions;

a client sub-region selection module 830, used for selecting a sub-region; and a client video analysis module 840, used for performing video analysis on the selected sub-region, and generating corresponding video analysis information, where the client input/output module 810 is further used for returning the video analysis information to the server.

Figure 9:
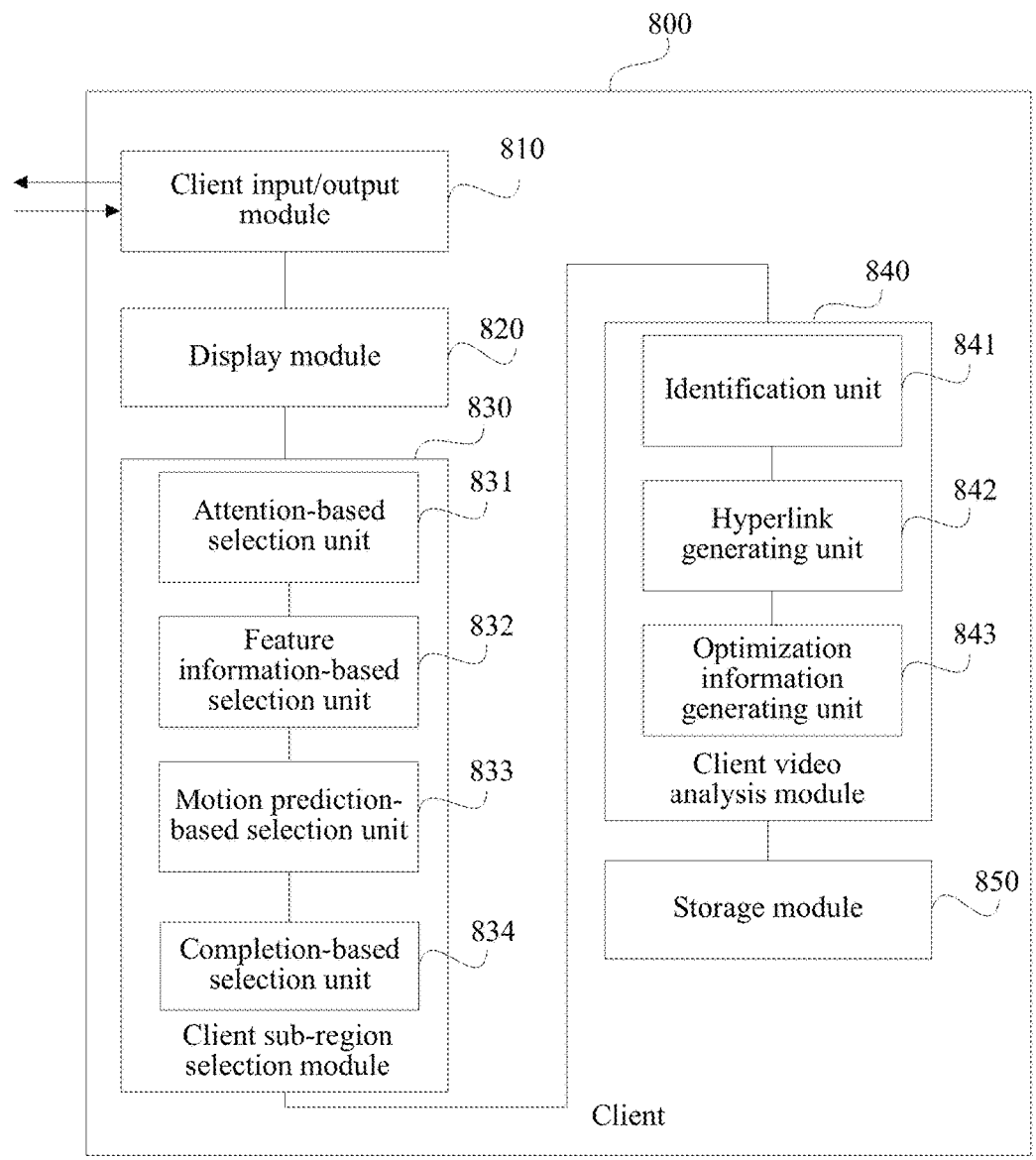
FIG. 9 is a schematic structural diagram of another client according to an embodiment of the present application.

As shown in FIG. 9, preferably, in a possible implementation manner of the embodiment of the present application, the client 800 further includes a display module 820, used for displaying the video.

In a possible implementation manner of the embodiment of the present application, the client sub-region selection module 830 includes an attention-based selection unit 831, which implements a function thereof according to corresponding description in the foregoing method embodiment.

Specifically, the attention-based selection unit 831 is used for selecting the sub-region according to attention of a user.

Preferably, in a possible implementation manner of the embodiment of the present application, the client sub-region selection module 830 includes a feature information-based selection unit 832, which implements a function thereof according to corresponding description in the foregoing method embodiment.

Specifically, the feature information-based selection unit 832 is used for selecting the sub-region according to feature information of a user.

Preferably, in a possible implementation manner of the embodiment of the present application, the client sub-region selection module 830 includes a motion prediction-based selection unit 833, which implements a function thereof according to corresponding description in the foregoing method embodiment.

Specifically, the motion prediction-based selection unit 833 is used for selecting the sub-region according to motion prediction of associated pixel groups in the video.

Preferably, in a possible implementation manner of the embodiment of the present application, the client sub-region selection module 830 includes a completion-based selection unit 834, which implements a function thereof according to corresponding description in the foregoing method embodiment.

Specifically, the completion-based selection unit 834 is used for determining whether to select the sub-region according to completion index information in the video related information.

Preferably, in a possible implementation manner of the embodiment of the present application, the client video analysis module 840 includes an identification unit 841, which implements a function thereof according to corresponding description in the foregoing method embodiment.

Specifically, the identification unit 841 is used for identifying an object in the sub-region, and generating identity information of the object.

Preferably, in a possible implementation manner of the embodiment of the present application, the identity information of the object includes adaptation-completed information.

Preferably, in a possible implementation manner of the embodiment of the present application, the video related information includes adaptation-completed information.

Preferably, in a possible implementation manner of the embodiment of the present application, the identification unit 841 performs mode adaptation on the object in the sub-region according to the adaptation-completed information, and updates the adaptation-completed information.

Preferably, in a possible implementation manner of the embodiment of the present application, the client video analysis module 840 further includes a hyperlink generating unit 842, which implements a function thereof according to corresponding description in the foregoing method embodiment.

Specifically, the hyperlink generating unit 842 is used for generating hyperlink information corresponding to the object.

Preferably, in a possible implementation manner of the embodiment of the present application, the video analysis information includes hyperlink information of an object in the sub-region.

Preferably, in a possible implementation manner of the embodiment of the present application, the client further includes a storage module 850, which implements a function thereof according to corresponding description in the foregoing method embodiment.

Specifically, the storage module 850 is used for storing the hyperlink information.

Preferably, in a possible implementation manner of the embodiment of the present application, the client video analysis module 840 includes an optimization information generating unit 843, which implements a function thereof according to corresponding description in the foregoing method embodiment.

Specifically, the optimization information generating unit 843 is used for generating sub-region setting optimization information.

Preferably, in a possible implementation manner of the embodiment of the present application, the optimization information generating unit generates the sub-region setting optimization information according to interaction with the user.

Preferably, in a possible implementation manner of the embodiment of the present application, the optimization information generating unit generates the sub-region setting optimization information according to a shape feature of associated pixel groups in the image of the video frame.

Preferably, in a possible implementation manner of the embodiment of the present application, the optimization information generating unit generates the sub-region setting optimization information according to an inter-frame relation of the video.

The client video analysis module 840 in the embodiment of the present application may further include other analysis units used for performing other video analysis on the sub-region.

The client may be a TV set, a desktop computer, and a device having a display apparatus and a computation capacity, for example, mobile terminals including a notebook computer, a tablet computer, a cell phone, and a vehicle mounted device.

Figure 10:
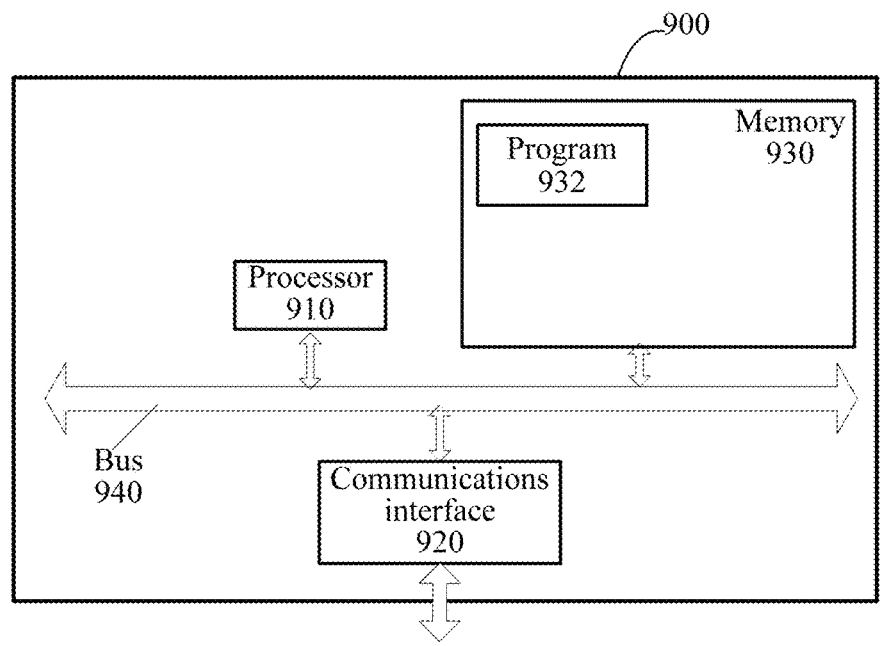
FIG. 10 is a schematic structural diagram of still another client according to an embodiment of the present application.

FIG. 10 is a schematic structural diagram of still another client 900 according to an embodiment of the present application, and the embodiment of the present application does not limit the specific implementation of the client. As shown in FIG. 10, the client 900 may include:

a processor 910, a communications interface 920, a memory 930, and a communication bus 940, where:

the processor 910, the communications interface 920, and the memory 930 communicate with each other through the communication bus 940.

The communications interface 920 is used for communication with network elements such as a client.

The processor 910 is used for executing a program 932, and may specifically execute related steps in the method embodiment shown in FIG. 3.

Specifically, the program 932 may include program code, and the program code includes a computer operating instruction.

The processor 910 may be a CPU, or an ASIC, or may be configured as one or more integrated circuits for implementing the embodiment of the present application.

The memory 930 is used for storing the program 932. The memory 930 may include a high-speed RAM, and may also include a non-volatile memory, for example, at least one disk memory. The program 932 specifically may enable the client 900 to execute the following steps:

receiving a video and video related information that are sent by a server, where an image of a frame in the video is formed of multiple sub-regions;

selecting a sub-region;
performing video analysis on the selected sub-region, and generating corresponding video analysis information; and
returning the video analysis information to the server.

For specific implementation of each step in the program 932, reference may be made to a corresponding step or corresponding description in a unit in the foregoing embodiments, and description is not repeated herein. It can be clearly understood by a person skilled in the art that, to make the description easy and precise, for a detailed working process of the foregoing devices and modules, reference may be made to the corresponding process description in the foregoing method embodiment, and description is not repeated herein.

Figure 11:
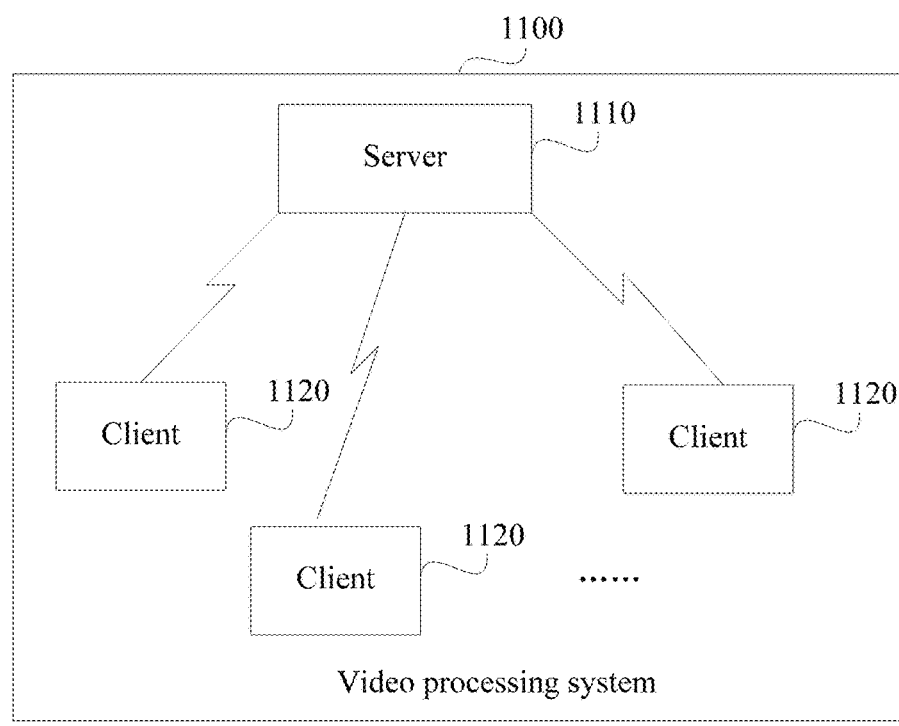
FIG. 11 is a schematic structural diagram of a video processing system according to an embodiment of the present application.

FIG. 11 shows a video processing system 1100 formed of a server 1110 and multiple clients 1120; the server 1110 herein may be the server described in the foregoing, and the client 1120 herein may be the client described in the foregoing.

By means of the foregoing apparatus and method, the processing cost of the video server is significantly reduced, and moreover, the efficiency and accuracy of the video analysis are improved.

Persons of ordinary skill in the field may realize that, the units and method steps of examples described in the embodiments disclosed in the present specification can be implemented by electronic hardware, or a combination of computer software and electronic hardware. Whether these functions are implemented as hardware or software depends upon the particular application and design constraint conditions of the technical solution. A person skilled in the art can use different methods to implement the described functions for each particular application, but such implementation should not be regarded as going beyond the scope of the present application.

If implemented in the form of software functional units and sold or used as an independent product, the functions may also be stored in a computer readable storage medium. Based on such understanding, the technical solution of the present application or the part that makes contributions to the prior art can be substantially embodied in the form of a software product. The computer software product may be stored in a storage medium and include several instructions for instructing computer equipment (for example, a personal computer, a server, or network equipment) to perform all or a part of steps of the method according to the embodiments of the present application. The foregoing storage medium includes any medium that can store program code, such as a USB flash disk, a removable hard disk, a Read-Only Memory (ROM), a Random Access Memory (RAM), a magnetic disk, or an optical disc.

The foregoing implementation manners are merely used for describing the present inventions rather than limiting the present inventions. Persons of ordinary skills in the art may make various variations without departing from the spirit and scope of the present application, and all the equivalent technical solutions also belong to the scope of the present application. The patent scope of the present application shall be subject to the claims.

What is claimed is:

1. A method, comprising:
sending, by a system comprising a processor, a video and at least one piece of video related information to at least one client, wherein an image of a frame in the video is formed of multiple sub-regions;
receiving at least one piece of video analysis information returned by the at least one client, wherein the at least one piece of video analysis information comprises identity information of an object in a sub-region of the multiple sub-regions; and
adjusting the at least one piece of video related information according to the at least one piece of video analysis information;
wherein the adjusting the at least one piece of video related information comprises performing a first action selected from a first group of actions, the first group of actions comprising:
adding the identity information of the object to the at least one piece of video related information,
modifying the identity information of the object in the at least one piece of video related information, and
deleting the identity information of the object from the at least one piece of video related information.

2. The method of claim 1, wherein the multiple sub-regions are distributed in the form of grids.

3. The method of claim 1, wherein sizes of the multiple sub-regions are set according to an image feature of the video.

4. The method of claim 3, wherein the image feature comprises resolution of the image or scene information of the image.

5. The method of claim 1, wherein the identity information of the object comprises adaptation-completed information.

6. The method of claim 1, wherein the at least one piece of video analysis information further comprises hyperlink information of the object in the sub-region of the multiple sub-regions.

7. The method of claim 6, wherein the adjusting the at least one piece of video related information according to the at least one piece of video analysis information comprises performing a second action selected from a second group of actions, the second group of actions comprising:
adding the hyperlink information of the object to the at least one piece of video related information,
modifying the hyperlink information of the object in the at least one piece of video related information, and
deleting the hyperlink information of the object from the at least one piece of video related information.

8. The method of claim 1, wherein the at least one piece of video analysis information comprises sub-region setting optimization information.

9. The method of claim 8, wherein the adjusting the at least one piece of video related information according to the at least one piece of video analysis information comprises:
adjusting settings of the sub-region of the multiple sub-regions according to the sub-region setting optimization information.

10. The method of claim 1, wherein the at least one piece of video related information comprises sub-region completion index information.

11. The method of claim 10, wherein the adjusting the at least one piece of video related information according to the at least one piece of video analysis information comprises:
updating the sub-region completion index information according to the at least one piece of video analysis information.

12. The method of claim 1, wherein:
the receiving the at least one piece of video analysis information returned by the at least one client comprises receiving the at least one piece of video analysis information returned by multiple clients of the at least one client, and the method further comprises:

before the adjusting of the at least one piece of video related information according to the at least one piece of video analysis information, integrating the at least one piece of video analysis information in response to the receiving the at least one piece of video analysis returned by the multiple clients.

13. The method of claim 1, further comprising:
before the adjusting of the at least one piece of video related information according to the at least one piece of video analysis information:
selecting at least one sub-region of the multiple sub-regions;
performing video analysis on the at least one sub-region; and
generating at least one piece of corresponding video analysis information.

14. The method of claim 13, further comprising:
before the adjusting of the at least one piece of video related information according to the at least one piece of video analysis information, integrating the at least one piece of video analysis information returned by the at least one client and the at least one piece of video analysis information generated by a server.

15. A method, comprising:
receiving, by a system comprising a processor, a video and at least one piece of video related information sent by a server, wherein an image of a frame in the video is formed of multiple sub-regions;
selecting at least one sub-region of the multiple sub-regions, resulting in at least one selected sub-region;
performing video analysis on the at least one selected sub-region;
generating at least one piece of video analysis information as a result of the performing the video analysis, wherein the at least one piece of video analysis information comprises identity information of an object in a sub-region of the multiple sub-regions; and
returning the at least one piece of video analysis information to the server, to initiate adjusting of the at least one piece of video related information according to the at least one piece of video analysis information,
wherein the adjusting of the at least one piece of video related information according to the at least one piece of video analysis information comprises performing an action selected from a group of actions, the group of actions comprising:
adding the identity information of the object to the at least one piece of video related information,
modifying the identity information of the object in the at least one piece of video related information, and
deleting the identity information of the object from the at least one piece of video related information.

16. The method of claim 15, wherein the selecting the at least one sub-region comprises:
selecting the at least one sub-region according to an attention determined for a user.

17. The method of claim 15, wherein the selecting the at least one sub-region comprises:
selecting the at least one sub-region according to feature information of a user.

18. The method of claim 15, wherein the selecting the at least one sub-region comprises:
selecting the at least one sub-region according to completion index information in the at least one piece of video related information.

19. The method of claim 15, wherein the selecting the at least one sub-region comprises:
selecting the at least one sub-region according to motion prediction of associated pixel groups in the video.

20. The method of claim 15, wherein the performing the video analysis on the sub-region, or the generating the at least one piece of corresponding video analysis information comprise:
generating the identity information of the object identified in the sub-region.

21. The method of claim 15, wherein the identity information of the object comprises adaptation-completed information.

22. The method of claim 15, wherein the at least one piece of video related information comprises adaptation-completed information.

23. The method of claim 22, wherein the generating the identity information of the object comprises performing mode adaptation on the object in the sub-region, according to the adaptation-completed information, and updating the adaptation-completed information.

24. The method of claim 15, further comprising:
generating hyperlink information corresponding to the object.

25. The method of claim 15, wherein the at least one piece of video related information comprises hyperlink information of the object in the video.

26. The method of claim 15, further comprising storing hyperlink information corresponding to the object.

27. The method of claim 15, wherein the performing the video analysis on the sub-region, or the generating the at least one piece of corresponding video analysis information comprise:
generating sub-region setting optimization information.

28. The method of claim 27, wherein the generating the sub-region setting optimization information comprises:
generating the sub-region setting optimization information according to an interaction with a user.

29. The method of claim 27, wherein the generating the sub-region setting optimization information comprises:
generating the sub-region setting optimization information according to a shape feature of associated pixel groups in the image of the frame of the video.

30. The method of claim 27, wherein the generating the sub-region setting optimization information comprises:
generating the sub-region setting optimization information according to an inter-frame relation of the video.

31. A server, comprising:
a memory that stores executable modules; and
a processor, coupled to the memory, that executes the executable modules to perform operations, the executable modules comprising:
a server input/output module used for sending at least one piece of video related information to at least one client, wherein an image of a frame in a video corresponding to the at least one piece of video related information is formed of multiple sub-regions, and for receiving at least one piece of video analysis information returned by the at least one client, wherein the at least one piece of video analysis information comprises identity information of an object in a sub-region of the multiple sub-regions; and
a video related information processing module used for adjusting the at least one piece of video related information according to the at least one piece of video analysis information,
wherein the adjusting the at least one piece of video related information according to the at least one piece of video analysis information comprises initiating an action selected from a group of actions comprising:
adding the identity information of the object to the at least one piece of video related information,
modifying the identity information of the object in the at least one piece of video related information, and
deleting the identity information of the object from the at least one piece of video related information.

32. The server of claim 31, wherein the server input/output module is further used for receiving at least one piece of video analysis information returned by multiple clients, and wherein the video related information processing module comprises an integration processing unit used for integrating the at least one piece of video analysis information returned by the at least one client.

33. The server of claim 31, the executable modules further comprising:
a server sub-region selection module used for selecting at least one sub-region of the multiple sub-regions; and
a server video analysis module used for generating corresponding at least one piece of video analysis information in response to performing video analysis on the at least one sub-region.

34. The server of claim 33, wherein the video related information processing module comprises:
an integration processing unit used for integrating the at least one piece of video analysis information returned by the at least one client and at least one piece of video analysis information generated by the server.

35. A client device, comprising:
a memory that stores executable modules; and
a processor, coupled to the memory, that executes the executable modules to perform operations of the client device, the executable modules comprising:
a client input/output module used for receiving a video and at least one piece of video related information that are sent by a server, wherein an image of a frame in the video is formed by multiple sub-regions;
a client sub-region selection module used for selecting a selected sub-region from at least one sub-region of the multiple sub-regions; and
a client video analysis module used for performing video analysis on the selected sub-region, and generating corresponding at least one piece of video analysis information,
wherein the at least one piece of video analysis information comprises identity information of an object in a sub-region of the multiple sub-regions, wherein the client input/output module is further used for returning the at least one piece of video analysis information to the server, so as to cause the server to perform an adjustment of the at least one piece of video related information according to the at least one piece of video analysis information;
wherein the adjustment of the at least one piece of video related information according to the at least one piece of video analysis information comprises an action selected from a group of actions comprising:
adding the identity information of the object to the at least one piece of video related information,
modifying the identity information of the object in the at least one piece of video related information, and
deleting the identity information of the object from the at least one piece of video related information.

36. The client device of claim 35, wherein the client sub-region selection module comprises:
an attention-based selection unit used for selecting the selected sub-region according to attention of a user.

37. The client device of claim 36, wherein the client sub-region selection module comprises:
a feature information-based selection unit used for selecting the selected sub-region according to feature information of a user.

38. The client device of claim 37, wherein the client sub-region selection module comprises:
a motion prediction-based selection unit used for selecting the selected sub-region according to motion prediction of associated pixel groups in the video.

39. The client device of claim 37, wherein the client sub-region selection module comprises:
a completion-based selection unit used for determining whether to select the selected sub-region according to completion index information in the at least one piece of video related information.

40. The client device of claim 37, wherein the client video analysis module comprises:
an identification unit used for identifying an object in the selected sub-region, and generating identity information of the object.

41. The client device of claim 40, wherein the identity information comprises adaptation-completed information.

42. The client device of claim 40, wherein the at least one piece of video related information comprises adaptation-completed information.

43. The client device of claim 42, wherein the identification unit performs mode adaptation on the object in the selected sub-region according to the adaptation-completed information, and updates the adaptation-completed information.

44. The client device of claim 40, wherein the client video analysis module further comprises:
a hyperlink generating unit used for generating hyperlink information corresponding to the object.

45. The client device of claim 37, wherein the at least one piece of video related information comprises hyperlink information of the object in the video.

46. The client device of claim 44, further comprising:
a storage module used for storing the hyperlink information.

47. The client device of claim 37, wherein the client video analysis module comprises:
an optimization information generating unit used for generating sub-region setting optimization information.

48. The client device of claim 47, wherein the optimization information generating unit generates the sub-region setting optimization information according to an interaction with the user.

49. The client device of claim 47, wherein the optimization information generating unit generates the sub-region setting optimization information according to a shape feature of associated pixel groups in the image of the frame of the video.

50. The client device of claim 47, wherein the optimization information generating unit generates the sub-region setting optimization information according to an inter-frame relation of the video.

51. A computer readable storage device comprising executable instructions that, in response to execution, cause a system comprising a processor to perform operations, comprising:
sending a video and at least one piece of video related information to a client device, wherein an image of a frame in the video is formed of multiple sub-regions;

receiving at least one piece of video analysis information returned by the client device wherein the at least one piece of video analysis information comprises identity information of an object in a sub-region of the multiple sub-regions; and adjusting the at least one piece of video related information according to the at least one piece of video analysis information, wherein the adjusting the at least one piece of video related information according to the at least one piece of video analysis information comprises:

adding the identity information of the object to the at least one piece of video related information, modifying the identity information of the object in the at least one piece of video related information, or deleting the identity information of the object from the at least one piece of video related information.

52. A computer readable storage device comprising executable instructions that, in response to execution, cause a system comprising a processor to perform operations, comprising:

receiving a video and at least one piece of video related information sent by a server, wherein an image of a frame in the video comprises multiple sub-regions;

selecting a selected sub-region of the multiple sub-regions;

performing video analysis on the selected sub-region;

generating at least one piece of video analysis information as a result of the performing the video analysis, wherein the at least one piece of video analysis information comprises identity information of an object in a sub-region of the multiple sub-regions; and returning the at least one piece of video analysis information to the server, so as to cause the server to adjust the at least one piece of video related information according to the at least one piece of video analysis information;

wherein adjusting the at least one piece of video related information according to the at least one piece of video analysis information comprises at least one of:

adding the identity information of the object to the at least one piece of video related information, modifying the identity information of the object in the at least one piece of video related information, or deleting the identity information of the object from the at least one piece of video related information.

53. The client device of claim 35, the executable modules further comprising:

a display module used for displaying the video.

54. The server of claim 31, wherein the video related information processing module further comprises a sub-region completion index information processing unit used for updating sub-region completion index information according to the video analysis information.

* * * * *